UNITED STATES PATENT OFFICE.

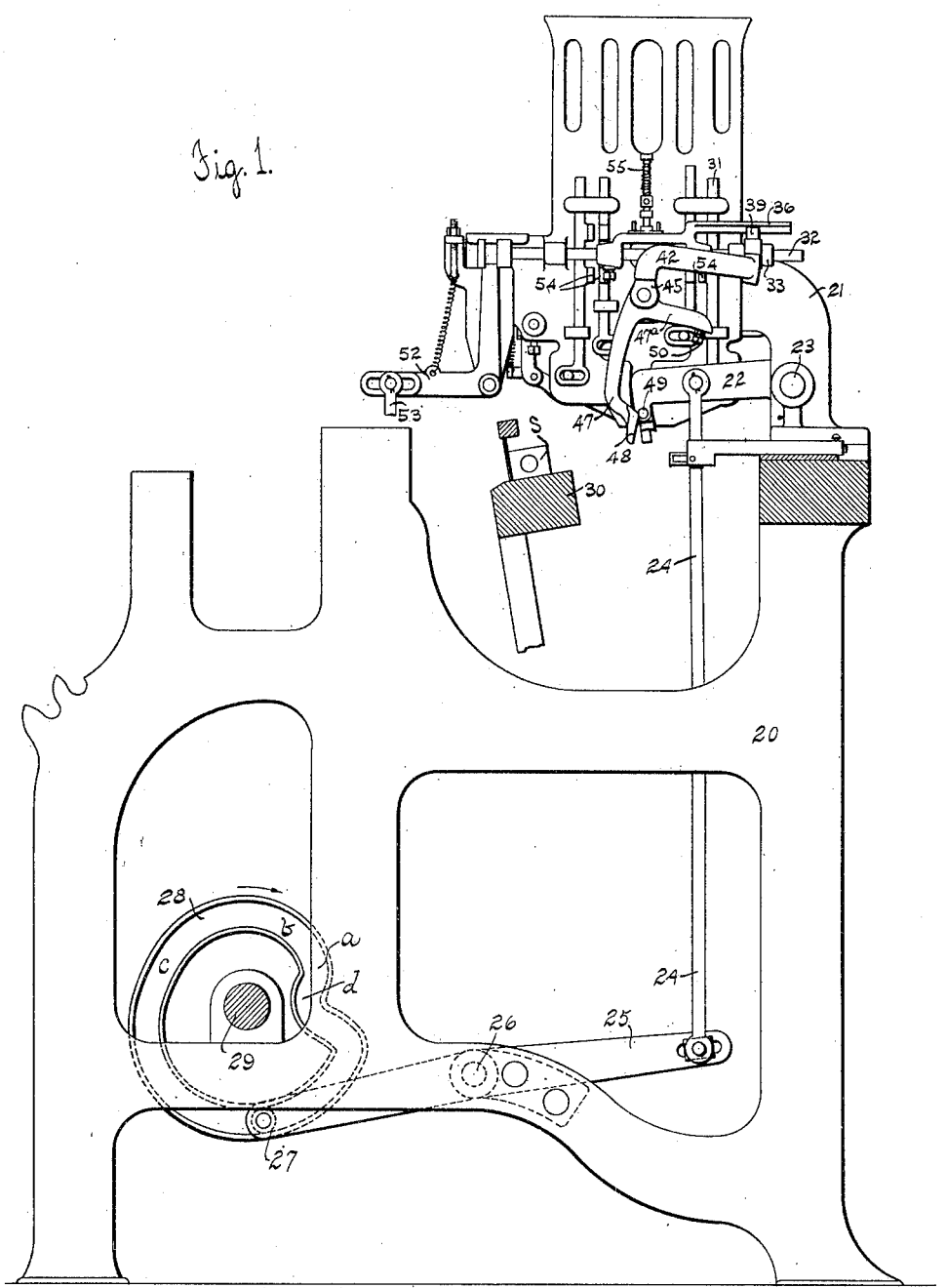

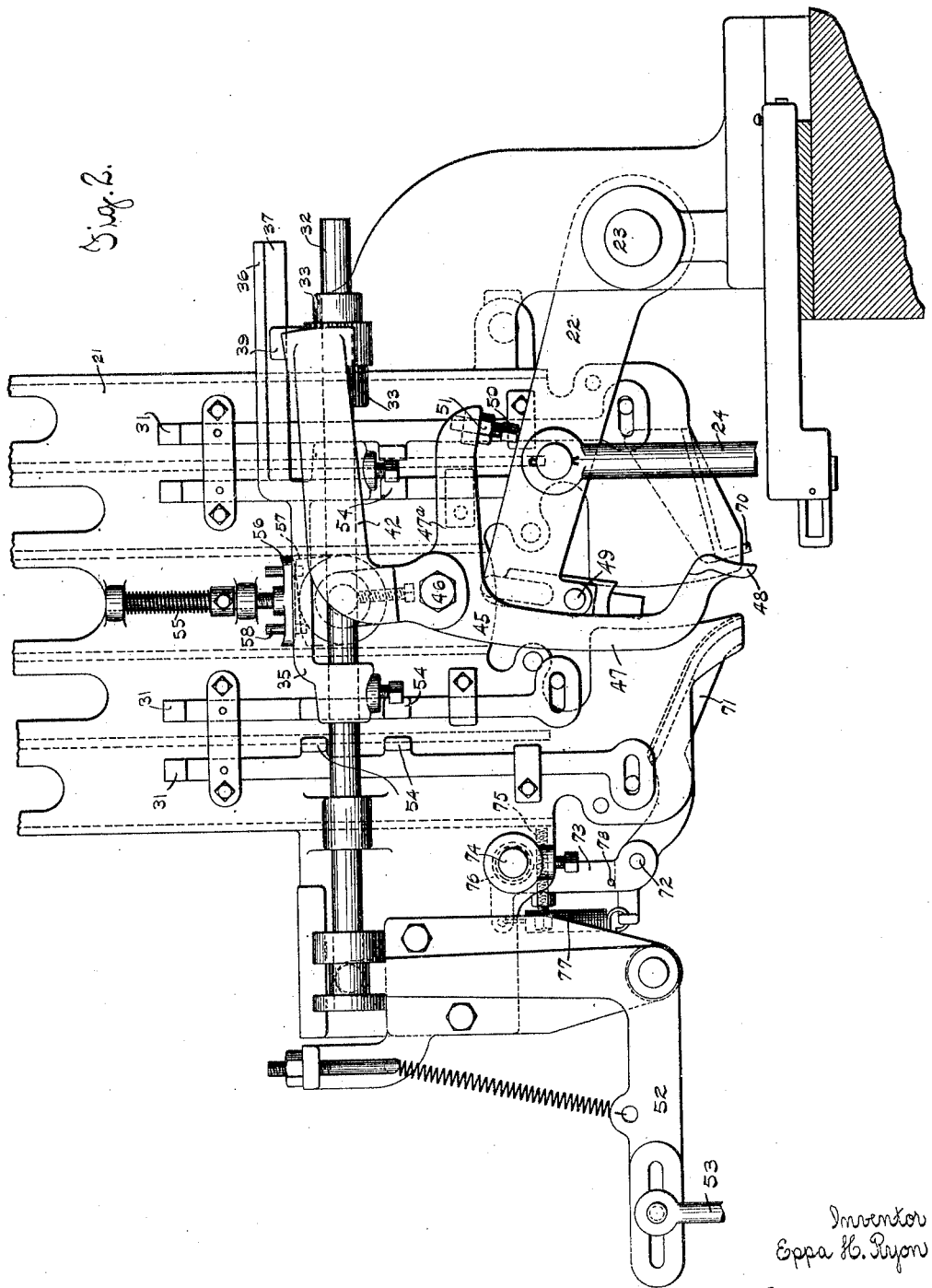

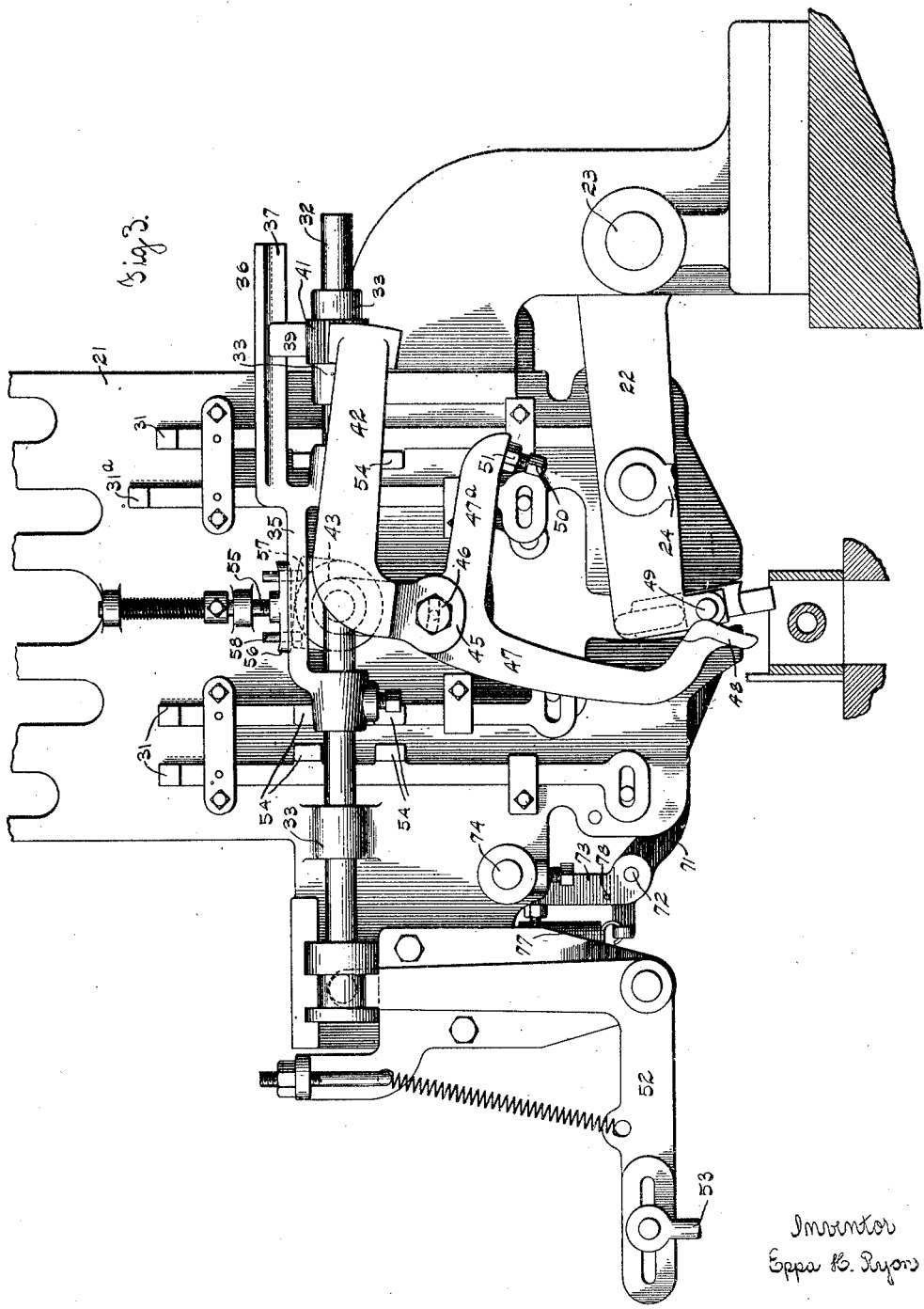

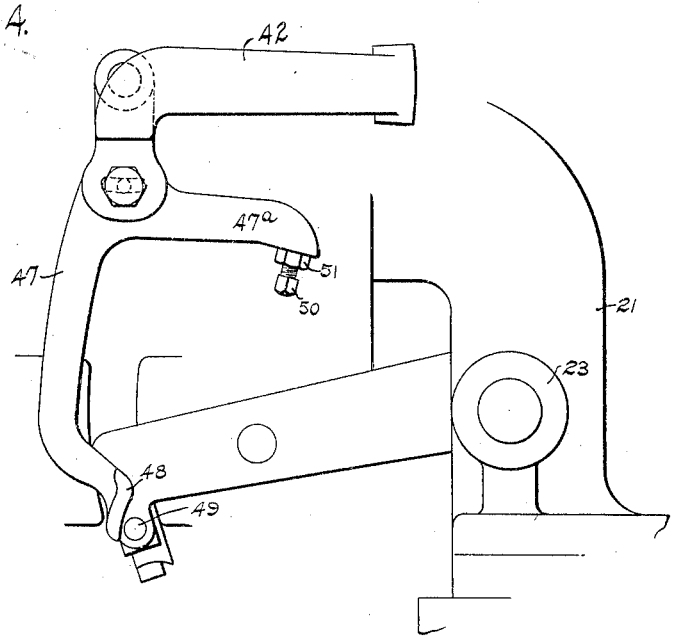
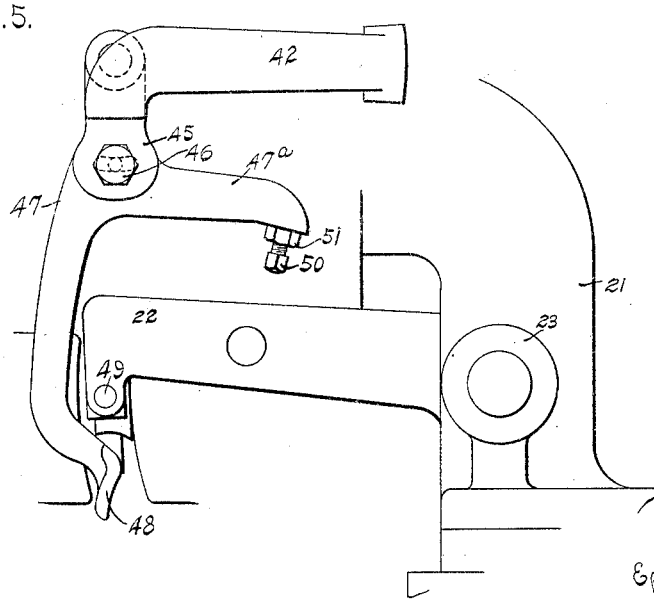

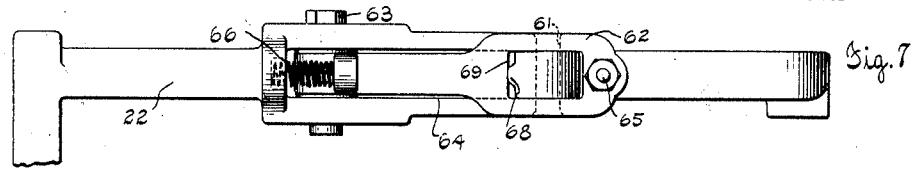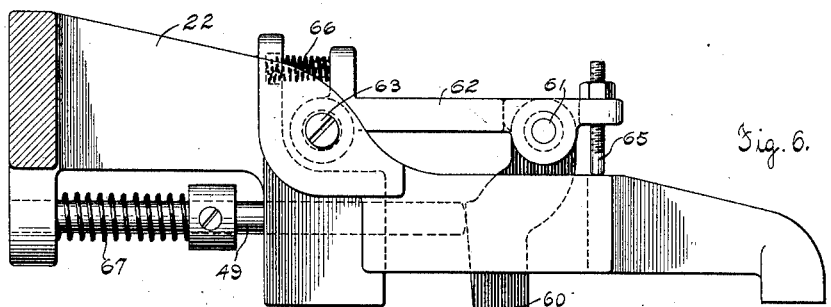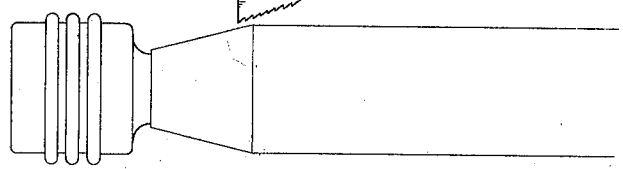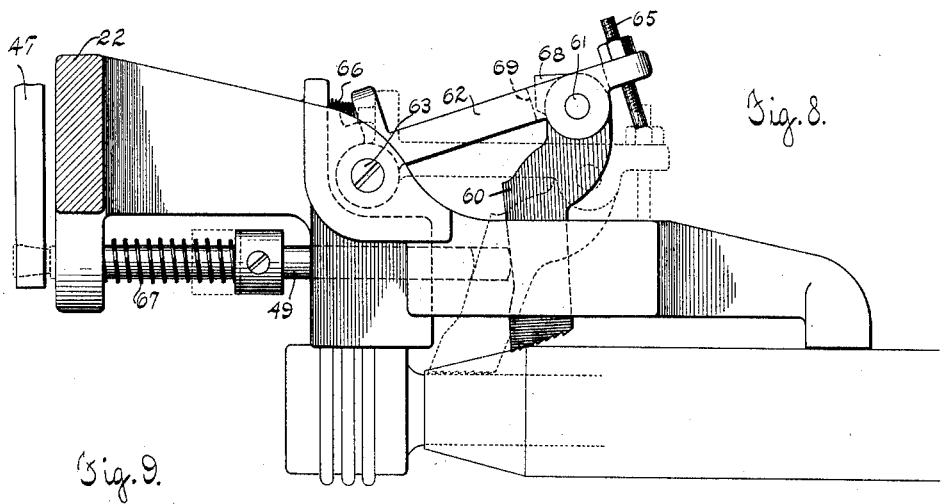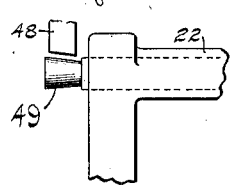

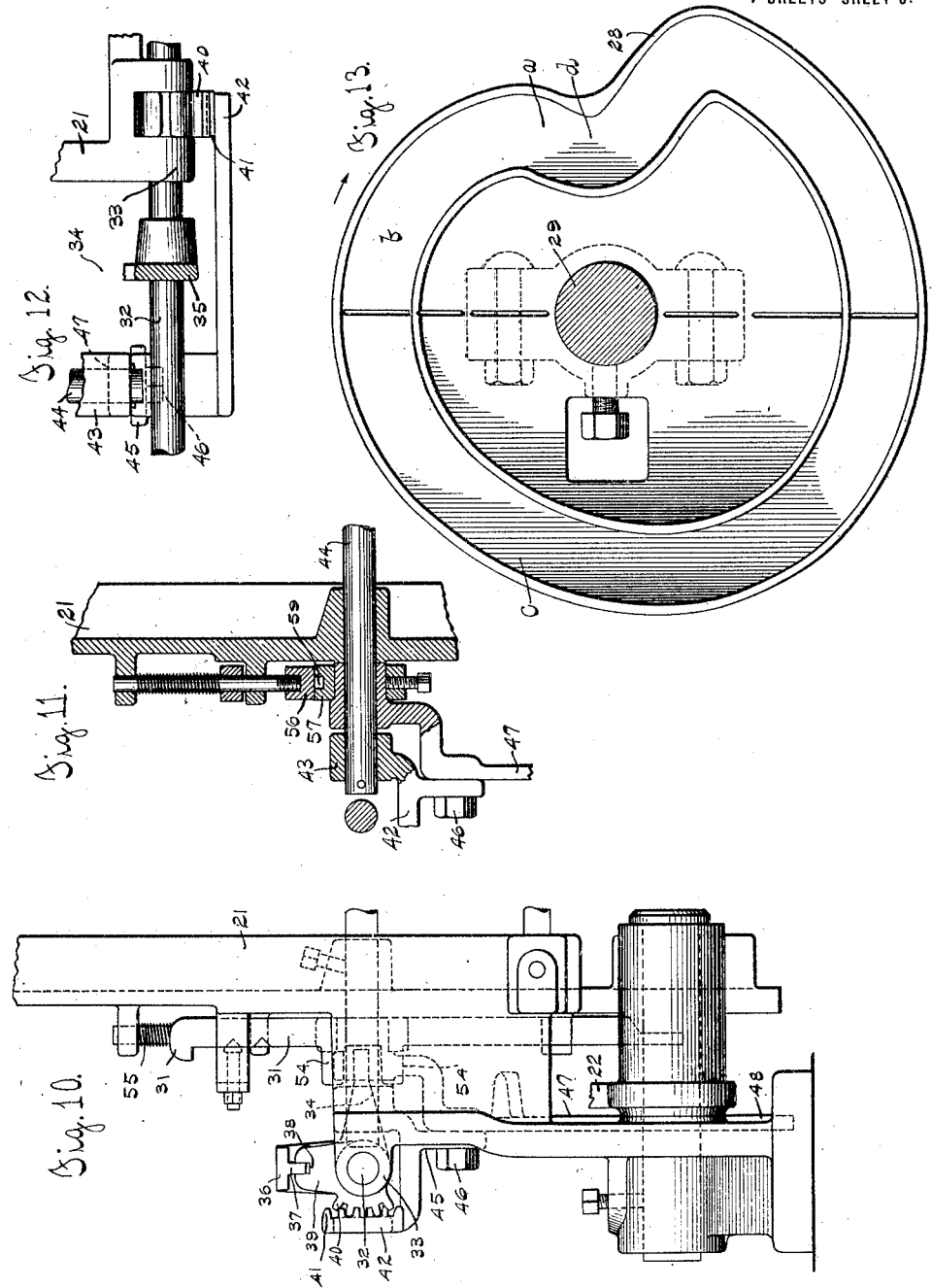

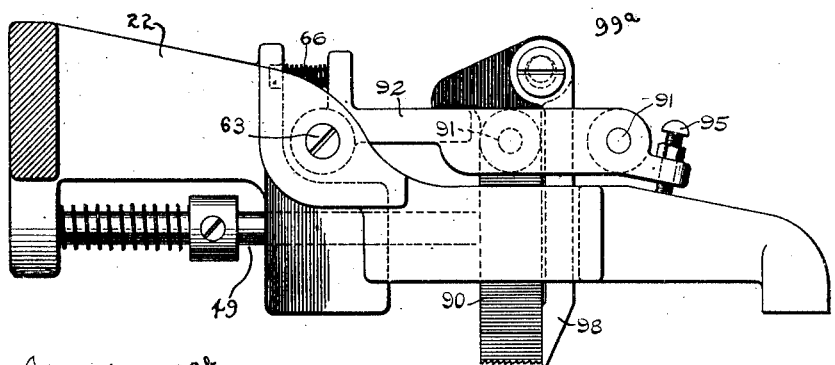
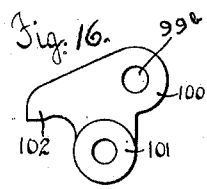
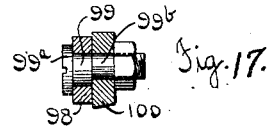
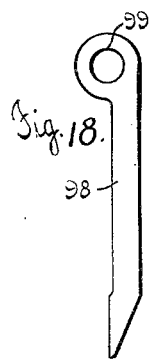
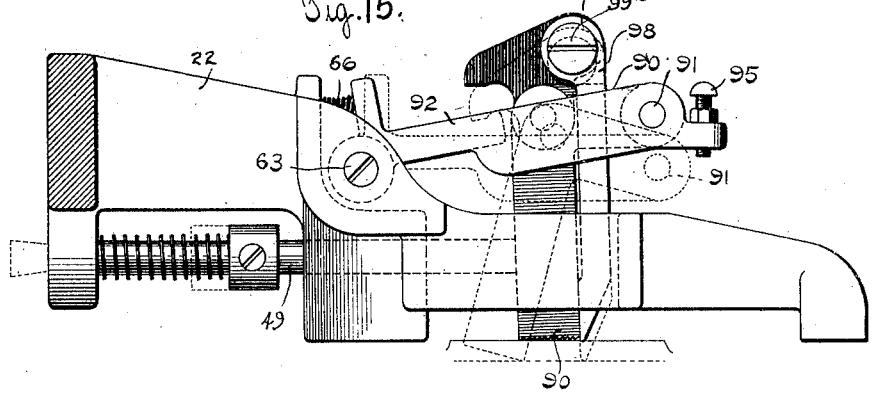

EPPA H. RYON, OF WALTHAM, MASSACHUSETTS, ASSIGNOR TO CROMPTON & KNOWLES LOOM WORKS, OF WORCESTER, MASSACHUSETTS, A CORPORATION OF MASSACHUSETTS.

WEFT-REPLENISHING LOOM.

1,372,316.  Specification of Letters Patent.  Patented Mar. 22, 1921.

Application filed July 12, 1918. Serial No. 244,637.

*To all whom it may concern:*

Be it known that I, EPPA H. RYON, a citizen of the United States, residing at Waltham, in the county of Middlesex and State of Massachusetts, have invented a new and useful Weft-Replenishing Loom, of which the following is a specification.

This invention relates to a weft replenishing loom and particularly to improved weft detecting and transferring devices therefor.

It is customary in such looms to provide means for indicating substantial or complete exhaustion of weft on the active weft carrier and also to provide mechanism controlled by said means effective to replenish the weft supply when such exhaustion is indicated.

It is the general object of my invention to provide improved devices for indicating weft exhaustion and for controlling weft replenishing.

In the preferred embodiment of my invention I provide a weft detector which is mounted on and movable with the transferrer by which a fresh weft carrier is inserted in the shuttle. This location of the detector, while desirable, is not essential to the utility of many features of my invention.

An important feature of my invention consists in the provision of actuating devices for the transferrer wholly independent of the lay and preferably giving said transferrer an operative movement once only in every two beats of the lay. Another feature of my invention relates to the provision of means for releasing a weft carrier and for advancing it to transfer position, said means being directly actuated by the transferrer.

Many important advantages arise from the use of my improvements herein described. My improved weft detector engages the weft carrier on the upper side thereof and is never positioned in the path of transfer of a weft carrier. Moreover the detector receives a detecting movement only when the shuttle is in the associated shuttle box, the detector remaining inoperative on each alternate beat of the lay. The detector and transferrer being actuated independently of the lay, are given a relatively slow motion as they approach the weft carrier, thus avoiding shock and inaccurate indications by the detecting mechanism. My improved construction also permits me to omit many parts heretofore found in similar replenishing mechanisms and to simplify the construction of the remaining parts.

In the preferred form of my invention I actuate the transferrer direct from the loom cam shaft which as usual makes one revolution for each two beats of the lay. By this method of operation I am able to control the weft indication, the weft carrier release, and the presentation of the weft carrier at the transfer point directly from the transferrer and in timed relation thereto.

Other features of my invention relate to arrangements and combinations of parts which will be hereinafter described and more particularly pointed out in the appended claims.

A preferred form of my invention is shown in the drawings, in which—

Figure 1 is a sectional elevation of a loom having my improved replenishing mechanism embodied therein;

Fig. 2 is a side elevation of the weft carrier magazine and transfer mechanism;

Fig. 3 is a view similar to Fig. 2, but showing the parts in a different position;

Figs. 4 and 5 are detail elevations of the transferrer and certain parts associated therewith, in different operative positions;

Fig. 6 is a front elevation of the combined transferrer and weft detector;

Fig. 7 is a plan view of the parts shown in Fig. 6;

Fig. 8 is a view similar to Fig. 6 but showing the parts in a different position;

Fig. 9 is a detail view of the sliding rod by which the releasing mechanism is operated and controlled;

Fig. 10 is a front elevation of certain parts of the weft carrier magazine and the weft carrier indicating and releasing mechanism mounted thereon;

Fig. 11 is a sectional elevation of certain of the parts shown in Fig. 10;

Fig. 12 is a plan view of the rack arm;

Fig. 13 is a side elevation of the cam which actuates the transferrer;

Fig. 14 is a front elevation of a modified form of weft detector;

Fig. 15 is a similar view with the parts in a different position, and

Figs. 16, 17 and 18 are detail views of separate parts in the modified form.

Referring to the drawings, I have indicated in Fig. 1 a loom side 20 upon which is mounted a weft carrier magazine 21 which, in its general construction and method of operation, closely resembles the magazine shown in my prior Patent No. 1,030,748 issued to me June 25, 1912.

A transferrer 22 is pivoted at 23 to the frame of the magazine 21, said transferrer being actuated through a rod 24 connecting the transferrer to one end of a lever 25 (Fig. 1) pivoted at 26 on the loom side 20 and having a cam roll 27 at its rear end positioned for engagement with a side cam 28 (Fig. 13) mounted on the usual cam shaft 29 which makes one revolution for every two beats of the lay 30. The transferrer is thus continuously actuated and is given an operative movement on every alternate beat of the lay. The movements of the transferrer are directly controlled by the cam 28 and the rate of movement of the transferrer is not dependent upon the rate of movement of the lay as is the case in my earlier patent.

The magazine 21 is provided with two or more vertically extending compartments in each of which a plurality of fresh weft carriers are supported. A retaining device or cradle is pivotally mounted at the lower end of each compartment and when moved in one direction permits the lowermost weft carrier in the compartment to drop into the cradle, and when moved in the opposite direction allows said weft carrier to advance to transferring position. The construction above decribed is the usual construction and is fully described in my prior patent.

Bars 31 (Fig. 2) are mounted to slide vertically in bearings on the magazine 21 and at their lower ends have pin and slot connection with the cradles above described. When one of the bars is moved upward from normal position, as indicated at 31ª in Fig. 3, the corresponding cradle is rocked to receive a weft carrier, and when the bar is thereafter moved downward the cradle is rocked in the opposite direction to permit the weft carrier to advance to the transfer point.

An important feature of my invention relates to improved devices for actuating the vertically sliding bars 31 by which the cradles are operated. For this purpose I provide a shaft 32 rotatable and also longitudinally movable in bearings 33 on the magazine 21. Arms 34, one of which is shown in dotted lines in Fig. 10, are secured to the shaft 32 and are longitudinally movable therewith. The two arms 34 extend horizontally from a yoke-shaped casting 35 (Fig. 2) adjustably secured to the shaft 32. The casting 35 has a portion 36 extending parallel to the shaft 32 but spaced therefrom, and having a depending web 37 extending into a notch 38 (Fig. 10) formed in the upper end of an arm 39 loosely mounted upon the shaft 32. The hub of the arm 39 is provided with pinion teeth 40 positioned for engagement by rack teeth 41 (Fig. 12) formed on the end of a rack arm 42. The rack arm 42 is provided with a hub 43 (Figs. 11 and 12) loosely pivoted upon a stud 44 fixed in the magazine frame 21. The rack arm 42 has also a depending slotted lug 45 through which extends a screw 46 by which the arm may be adjustably secured to an actuating member 47 also loosely pivoted upon the stud 44.

The actuating member 47 is provided with a depending portion having a cam face 48 positioned for engagement by a stud 49 which at times projects beyond the side surface of the transferrer 22. This stud 49 is under the control of the weft detecting mechanism and projects into the path of the cam surface 48 only when the weft on the active weft carrier is substantially exhausted. This weft detecting mechanism will be hereinafter fully described.

The second arm 47ª of the actuating member 47 projects laterally therefrom and is provided with an adjusting screw 50 and check nut 51, the screw 50 being positioned for engagement by the transferrer 22 as the transferrer approaches its upper limit of travel. The parts are so timed that the stud 49 is always withdrawn out of the path of the cam face 48 during the descent of the transferrer. Upon substantial weft exhaustion, however, the stud is projected into the path of the cam 48 before the transferrer rises, and on subsequent upward movement the stud rocks the actuating member 47 to the position shown in Fig. 3. This movement is communicated through the rack bar 42 and pinion teeth 40 to the arm 39 engaging the extended portion 36 of the yoked casting 35, and the laterally extending arms 34 (Fig. 10) are thus raised. The shaft 32 is moved longitudinally by a bell crank 52 (Fig. 3) connected through a link 53 and other parts (not shown) to pattern devices associated with the drop box mechanism and fully described in my prior patent above referred to. In every longitudinal position of the shaft 32 one of the arms 34 will be positioned between a pair of vertically spaced lugs 54 (Fig. 10) formed on the side of one of the sliding bars 31. Movement of the arm 34 in either direction will thus cause similar movement of the associated sliding bar 31. When the actuating member 47 is moved to the position shown in Fig. 3 one of the sliding bars 31 will be raised, as indicated at 31ª, thus rocking the corresponding cradle and releasing the lowermost weft carrier in the associated magazine compartment. This movement takes place when the roll 27 is in the portion $a$ of the cam 28

(Fig. 13) which portion is followed by an extended concentric portion b which holds the transferrer 22 in the intermediate position shown in Fig. 5 during the next beat of the lay, at which time the shuttle is at the opposite side of the loom.

As the shuttle returns to the magazine end of the lay, the portion c of the cam raises the transferrer to the position shown in Fig. 2, during which movement it engages the stop screw 50 on the lateral extension 47ª of the actuating member 47, and moves the rack bar 42 upward, rotating the pinion 40 in a direction to depress the arms 34. If there has been no change in the position of the drop boxes, such movement of the arms 34 will restore the raised bar 31ª to its original position, thus rocking the cradle in the opposite direction and advancing the weft carrier to the position for transfer. If, however, a change in the drop boxes has caused longitudinal movement of the shaft 32, the arm 34 will no longer be associated with the raised bar 31ª, which will therefore be left in raised position until the return of the corresponding shuttle.

To restore the arms 34 and associated parts to normal angular position, I provide a spring plunger 55 (Figs. 2 and 3) slidable in bearings in the magazine 21 and having a laterally extending head 56 at its lower end adapted to engage the substantially straight side of a collar 57 (Figs. 3 and 11) adjustably secured to the hub of the actuating member 47. Pins 58 in the head 56 extend into a groove 59 (Fig. 11) in the collar and prevent lateral displacement of the parts. Movement of the collar with the actuating member in either direction will raise the plunger 55 against its spring, which spring will tend constantly to restore the actuating member to normal position. The relative position of the transferrer 22 with relation to the actuating member 47 when the transferrer is at its lower limit of travel is shown diagrammatically in Fig. 4, this position corresponding to the point d on the cam 28 (Fig. 13).

I will now describe the weft detecting mechanism by which the stud 49 is controlled. Referring to the form shown in Figs. 6, 7, and 8, a detecting member or feeler 60 is pivoted at 61 to an arm 62 which in turn is pivoted at 63 to the transferrer 22. The feeler 60 is freely movable vertically in a slot 64 in the transferrer 22. Downward movement of the feeler 60 and arm 62 relative to the transferrer 22 is limited by an adjustable stud 65 threaded in the end of the arm 62 and engaging the upper side of the transferrer. A relatively stiff spring 66 forces the arm 62 yieldingly downward. The stud 49 is slidable horizontally in bearings in the transferrer 22 and the normal position of the assembled parts is that shown in Fig. 6, a spring 67 yieldingly holding the stud 49 in engagement with the feeler 60. Movement of the feeler 60 to the right, as viewed in Figs. 6 and 8, is limited by a stop shoulder 68 formed on the feeler and engaging a surface 69 on the arm 62 when the feeler reaches the position shown in Fig. 6.

When the transferrer is moved downward by the operation of the cam 28 the feeler 60 engages the weft carrier. The lower end of the feeler is preferably notched as shown in the drawings, and the engagement of this notched end of the feeler with the weft of an unexhausted weft carrier prevents movement of the feeler longitudinally of the weft carrier. The feeler is thus moved upward to full line position shown in Fig. 8, but the edge of the feeler which engages the stud 49 is so designed that no movement of the stud to the left will take place. If, however, the weft upon the active weft carrier is substantially exhausted, the teeth on the feeler will no longer prevent lateral movement thereof and the feeler will move to the left to the position indicated in dotted lines in Fig. 8, thus causing the stud 49 to project beyond the side of the transferrer 22 and into the path of the cam face 48 on the actuating member 47. The springs 66 and 67 are so proportioned and the position of the pivot 61 is so selected that it will be easier for the feeler to move to the left than for it to raise the arm 62 whenever the supply of weft is too thin to hold the teeth of the feeler. The end of the stud 49 is preferably inversely tapered, as indicated in Fig. 9, so that it may be retained in its outward position by engagement with the cam face 48 on the actuator 47 and thus fully depress the arm 42 before being withdrawn by its spring 67.

After the weft carrier is advanced to transfer position, it is yieldingly held between a fixed flange or guide 70 (Fig. 2) and a yielding guide 71 pivoted at 72 to the lower end of an arm 73 pivoted at 74 on the magazine 21. An adjusting screw 75 on the arm 73 limits movement thereof to the right, as viewed in Fig. 2, such movement being caused by a coil spring 76 surrounding the pivot 74 and indicated in dotted lines in Fig. 2. A spring 77 is secured between lugs projecting from the guide 71 and the arm 73 respectively, and yieldingly holds these parts in the position shown in Fig. 2, further relative movement being prevented by a stop pin 78.

Under normal conditions, when a bobbin is transferred the guide 71 swings downward and outward about the pivot 74, thus permitting the weft carrier to escape. If, however the weft carrier is caught in the shuttle and engages the end of the guide 71 as the lay moves backward, the guide swings about its pivot 72 on the arm 73 as well as about the pivot 74 and thus escapes injury.

As the transferrer 22 is positively actuated from the cam shaft, it is also necessary to stop the loom in order to prevent transfer of a weft carrier after it is advanced to the transfer point and for this purpose I provide an improved shuttle placer.

This shuttle placer is effective to position the shuttle for transfer whenever possible, and to stop the loom and thereby prevent transfer when the shuttle is widely displaced. No disclosure nor claim is made in this application as to the novel features of this improved shuttle placer, as this device forms the subject matter of a co-pending application.

In Figs. 14 to 18, I have shown a different form of detecting mechanism, in which two relatively movable detecting members are used. A toothed swinging detector 90 is pivoted at 91 to the outer end of an arm 92 which in turn is pivoted at 63 to the transferrer 22. The arm 92 is provided with an adjustable stop 95 and with a spring 66 of the form previously described. The detector 90 engages the spring-pressed pin or stud 49 as in the form shown in Fig. 6. A second detector 98 is pivoted at 99 on an eccentric screw 99$^a$ adjustable in a link 100 at 99$^b$. The link 100 in turn is pivoted at 101 to the detector 90. The link 100 also has a projection 102 engaging the upper face of the arm 92. The detector 98 may be adjusted by the eccentric screw 99$^a$ so that it projects slightly below the detector 90, but permits the teeth of the detector 90 to engage the weft on an unexhausted weft carrier. Such engagement prevents separation of the detectors, which are moved directly upward without changing the position of the stud 49. When the weft is substantially exhausted, however, the detector 90 is permitted to swing to the left, such movement occurring when the detector 98 engages the bobbin and exerts upward pressure upon the screw 99$^a$ by which it is connected to the link 100. Such pressure tends to turn the link about the point of engagement of the link projection 102 with the arm 92, thus raising the pivot 101 by which the link is connected to the detector 90. This movement swings the detector 90 about its pivot 91 on the arm 92 and moves the stud 49 to the left to operative position.

Having fully described the construction and operation of my improved weft detecting and weft replenishing mechanism, many advantages thereof will be apparent, certain of which have been already pointed out in the specification. I no longer depend upon the weft detector to establish operative relations between the transferrer and its actuating devices, and I also omit entirely the transfer revoking mechanism found in my previous patent. The actuation of the transferrer from a continuously moving cam permits me to time the operations much more accurately than was possible when the transferrer was actuated from the lay. Both the detecting and the transferring movements are made with less shock to the parts than was possible with the previous arrangement.

Having fully described my invention, it will be evident that changes and modifications can be made therein by those skilled in the art without departing from the spirit and scope thereof as set forth in the claims, and I do not wish to be otherwise limited to the details herein disclosed, but what I claim is—

1. In a weft replenishing loom, in combination, a weft carrier magazine, a transferrer, and means for giving said transferrer a transferring movement on every alternate beat of the lay.

2. In a weft replenishing loom in combination, a weft carrier magazine, a transferrer, means to give said transferrer regularly repeated normally inoperative transferring movements, and weft controlled means to render a selected transferring movement operative.

3. In a weft replenishing loom in combination, a weft carrier magazine, a transferrer, means to give said transferrer regularly repeated normally inoperative transferring movements, a weft detector and means to advance a fresh weft carrier into the path of said transferrer upon indication of substantial weft exhaustion by the said detector.

4. In a weft replenishing loom, in combination, a weft carrier magazine, a transferrer, and mechanism including a cam effective to give said transferrer a positive transferring movement on every alternate beat of the lay.

5. In a weft replenishing loom, in combination, a weft carrier magazine, a transferrer, a detector mounted on said transferrer and movable therewith, and means to give said transferrer a gradually increasing rate of movement as it moves toward the weft carrier in the active shuttle.

6. In a weft replenishing loom, in combination, a weft carrier magazine, a transferrer, and mechanism effective to give said transferrer a positive transferring movement on every alternate beat of the lay, such movement being at varying speeds independent of the variations in the speed of the lay.

7. In a weft replenishing loom in combination, a weft carrier magazine, a transferrer, means to give said transferrer regularly repeated normally inoperative transferring movements, a weft detector mounted on said transferrer and means controlled by said detector effective to render a selected movement of said transferrer operative upon indication of substantial weft exhaustion by said detector.

8. In a weft replenishing loom, in combination, a weft carrier magazine, a transferrer, means to give said transferrer regularly repeated transferring movements, and weft controlled means to render a selected transferring movement operative.

9. In a weft replenishing loom, in combination, a weft carrier magazine, a transferrer, and a weft detector mounted on and movable with said transferrer.

10. In a weft replenishing loom, in combination, a weft carrier magazine, a transferrer, means to give said transferrer a transferring operative movement on every alternate beat of the lay, and a weft detector mounted on and movable with said transferrer.

11. In a weft replenishing loom, in combination, a weft carrier magazine normally holding all weft carriers therein out of transfer position, a transferrer, means to actuate said transferrer at predetermined regular intervals, a weft detector, and mechanism operable by said transferrer upon substantial exhaustion of weft on the active weft carrier, effective to control the advance of a fresh weft carrier to transfer position.

12. In a weft replenishing loom, in combination, a weft carrier magazine, a transferrer, means to operate said transferrer on every alternate beat of the lay, weft detecting mechanism on said transferrer, and a transfer-indicating device operable by said transferrer on its non-detecting stroke.

13. In a weft replenishing loom, in combination, a weft carrier magazine, a transferrer, weft detecting mechanism carried thereby, and devices actuated from said transferrer effective to release a weft carrier in said magazine and to advance said weft carrier to transfer position.

14. In a weft replenishing loom, in combination, a weft carrier magazine, a transferrer, a weft detector, and means actuated by said transferrer to advance a weft carrier to intermediate position upon indication of weft exhaustion and to thereafter advance said weft carrier to transfer position.

15. In a weft replenishing loom, in combination, a weft carrier magazine, a transferrer, weft carrier controlling mechanism including a shaft movable angularly in two directions from normal position, and connections from said transferrer to said shaft whereby upward movement of said transferrer causes successive angular movements of said shaft in oppoite directions to advance a weft carrier.

16. In a weft replenishing loom, in combination, a weft carrier magazine, a transferrer, weft carrier controlling mechanism including a shaft movable angularly in two directions from normal position, and connections from said transferrer to said shaft whereby upward movement of said transferrer causes successive angular movements of said shaft in opposite directions to advance a weft carrier to transfer position, said transferrer having a dwell in its upward movement between the opposite angular movements of said shaft.

17. In a weft replenishing loom, in combination, a weft carrier magazine, a transferrer, and weft detecting mechanism mounted on and movable with said transferrer, said mechanism comprising an arm pivoted to said transferrer, a swinging detector pivoted to said arm and a second detector connected to said swinging detector.

18. In a weft replenishing loom, in combination, a weft carrier magazine, a transferrer, and weft detecting mechanism mounted on and movable with said transferrer, said mechanism comprising an arm pivoted to said transferrer, a swinging detector pivoted to said arm, a link pivoted to said swinging detector and engaging said arm, and a second detector pivoted to said link and normally positioned adjacent said swinging detector.

19. In a weft replenishing loom, in combination, a weft carrier magazine, a transferrer, and weft detecting mechanism mounted on and movable with said transferrer, said mechanism comprising an arm pivoted to said transferrer, an adjustable stop to relatively position said arm and transferrer, a toothed swinging detector pivoted to said arm, a link pivoted to said swinging detector and having a projection engaging said arm, and a second detector pivoted to said link and normally positioned adjacent said swinging detector, said second detector engaging the weft carrier in advance of said swinging detector.

20. In a weft replenishing loom, in combination, a weft carrier magazine, a transferrer, and weft detecting mechanism mounted on and movable with said transferrer, said mechanism comprising an arm pivoted to said transferrer, an adjustable stop to relatively position said arm and transferrer, a toothed swinging detector pivoted to said arm, a link pivoted to said swinging detector and having a projection engaging said arm, a second detector normally positioned adjacent said swinging detector, and an eccentric pivotal connection between said second detector and said link.

21. In a weft replenishing loom, in combination, a weft carrier magazine, a transferrer, and weft detecting mechanism mounted on and movable with said transferrer, said mechanism comprising an arm pivoted to said transferrer, an adjustable stop to relatively position said arm and transferrer, a toothed swinging detector pivoted to said arm, a link pivoted to said swinging detector and having a projection engaging said arm, a second detector normally positioned adjacent said swinging detector, and means to adjust one of said detectors toward and from a weft carrier and relatively to the other detector.

22. In a weft replenishing loom, in combination, a weft carrier magazine, a transferrer, means to give said transferrer regularly repeated transferring movements, and weft controlled means to advance a weft carrier into the path of movement of said transferrer.

23. In a weft replenishing loom, in combination, a weft carrier magazine, a shuttle, a weft detector comprising relatively fixed and movable detecting members, said detector being supported independently of the lay and engaging the weft carrier through the open upper side of the shuttle, and means to transfer a weft carrier after indication of substantial weft exhaustion.

24. In a loom, a combined transferrer and weft detector, and automatic means to render said transferrer and detector intermittently operative.

25. In a loom, a transferrer, a weft detector mounted on said transferrer and having a weft engaging element movable axially of the weft carrier to indicate substantial weft exhaustion, and means to actuate said transferrer to cause said detector to intermittently engage the upper side of the active weft carrier through the open top of the shuttle.

In testimony whereof I have hereunto affixed my signature.

EPPA H. RYON.